(12) United States Patent
Kydd

(10) Patent No.: US 10,439,428 B2
(45) Date of Patent: Oct. 8, 2019

(54) MINIMUM-COST EVPV FOR VEHICLE-SOLAR-GRID INTEGRATION

(71) Applicant: Paul Harriman Kydd, Lawrenceville, NJ (US)

(72) Inventor: Paul Harriman Kydd, Lawrenceville, NJ (US)

( * ) Notice: Subject to any disclaimer, the term of this patent is extended or adjusted under 35 U.S.C. 154(b) by 203 days.

(21) Appl. No.: 15/441,484

(22) Filed: Feb. 24, 2017

(65) Prior Publication Data

US 2018/0244170 A1    Aug. 30, 2018

(51) Int. Cl.
| | | |
|---|---|---|
| *H02J 7/35* | (2006.01) | |
| *B60L 8/00* | (2006.01) | |
| *B60L 53/16* | (2019.01) | |
| *B60L 53/20* | (2019.01) | |
| *B60L 53/64* | (2019.01) | |
| *B60L 55/00* | (2019.01) | |
| *B60L 53/10* | (2019.01) | |
| *B60L 53/51* | (2019.01) | |
| *H02J 3/32* | (2006.01) | |
| *H02J 3/38* | (2006.01) | |

(52) U.S. Cl.
CPC ............... *H02J 7/35* (2013.01); *B60L 8/003* (2013.01); *B60L 53/11* (2019.02); *B60L 53/16* (2019.02); *B60L 53/20* (2019.02); *B60L 53/51* (2019.02); *B60L 53/64* (2019.02); *B60L 55/00* (2019.02); *H02J 3/32* (2013.01); *H02J 3/382* (2013.01); *B60L 2210/30* (2013.01); *B60L 2210/40* (2013.01); *Y02E 60/721* (2013.01); *Y02T 10/7005* (2013.01); *Y02T 10/7083* (2013.01); *Y02T 10/7241* (2013.01); *Y02T 90/14* (2013.01); *Y04S 10/126* (2013.01)

(58) Field of Classification Search
CPC .............. B60L 11/1842; B60L 11/1818; B60L 11/1811; B60L 8/003; B60L 11/184; B60L 2210/30; B60L 2210/40; H02J 7/35
See application file for complete search history.

(56) References Cited

U.S. PATENT DOCUMENTS

| | | | | |
|---|---|---|---|---|
| 8,463,449 | B2 * | 6/2013 | Sanders ................. | G05B 15/02 320/101 |
| 8,509,976 | B2 * | 8/2013 | Kempton ............ | B60L 11/1824 701/22 |
| 9,566,867 | B2 * | 2/2017 | Kydd .................. | B60L 11/1811 |
| 9,787,117 | B2 * | 10/2017 | Bai ....................... | H02J 7/0052 |
| 10,020,656 | B2 * | 7/2018 | Saussele ................ | H02S 10/20 |
| 2009/0174259 | A1 * | 7/2009 | Lin ........................ | H02J 7/35 307/65 |
| 2012/0249065 | A1 * | 10/2012 | Bissonette ........... | B60L 11/184 320/109 |

(Continued)

*Primary Examiner* — Michael C Zarroli

(57) ABSTRACT

This invention consists of an apparatus to interface an electric vehicle battery with a solar photovoltaic system and a method of using the apparatus to provide back up power during grid outages and ancillary service revenue from the grid. The apparatus uses the solar PV inverter to provide bidirectional power flow from the battery during night-time hours, or whenever the solar array is producing insufficient power. The apparatus thus consists only of switches and control and measurement equipment. It relies on the otherwise underutilized inverter and the on-board vehicle battery charger as the power electronic components, thus minimizing cost.

14 Claims, 2 Drawing Sheets

(56) References Cited

U.S. PATENT DOCUMENTS

| | | | |
|---|---|---|---|
| 2013/0049674 A1* | 2/2013 | Davis | B60L 11/182 |
| | | | 320/101 |
| 2013/0113413 A1* | 5/2013 | Harty | H01M 10/465 |
| | | | 320/101 |
| 2017/0170683 A1* | 6/2017 | Navarro | G06F 1/263 |
| 2018/0037121 A1* | 2/2018 | Narla | H02M 3/04 |
| 2018/0054064 A1* | 2/2018 | Narla | H02J 3/383 |

* cited by examiner

MINIMUM-COST EVPV FOR VEHICLE-SOLAR-GRID INTEGRATION

CROSS-REFERENCE TO RELATED APPLICATIONS

This application is related to U.S. patent application "Vehicle-Solar-Grid Integration" Ser. No. 14/101,423 filed Dec. 10, 2013, now published as US-2015-0162784-A1, by the present inventor, and Provisional Patent Applications "Bidirectional Power Electronic Interface" No. 61/889,067, filed Oct. 10, 2013, "Bidirectional Power Electronic Interface with Sustaining Power" 61/921,583, filed Dec. 30, 2013, "Vehicle-Solar-Grid Integration with Supplementary Battery" 62/050,819, filed Sep. 16, 2014, and "Low-Cost EVPV for Vehicle-Solar-Grid Integration", filed Feb. 19, 2016, by the present inventor.

This application claims priority dating to Provisional Patent Application No. 62/299,756 entitled "Minimum Cost EVPV for Vehicle-Solar-Grid Integration" filed on Feb. 25, 2016.

FEDERALLY SPONSORED RESEARCH

None

CITED LITERATURE

SAE J-1772 revised October 2012, p 32.
IEEE Standard 1547 net metering interconnection to the grid

BACKGROUND OF THE INVENTION

Electric vehicles with large storage batteries represent an underutilized resource that can serve to stabilize the electric utility grid and reduce the requirement for additional investment in distribution and transmission equipment, if they can be remotely directed to take or provide AC power. The communication technology for the remote control exists, together with an existing market for ancillary services to the grid. Solar inverters can convert DC power from the battery to AC power for the grid.

This bidirectional flow of power can provide valuable services to the utility grid. An example of the latter is frequency regulation in which battery storage can take excess power or provide needed power instantly on request from the Independent System Organization or Regional Transmission Organization (ISO/RTO) responsible for grid stability. The ISO/RTOs pay for this ancillary service in a daily auction market. Another service is demand response in which the battery can stop charging at periods of peak demand when the power is needed elsewhere on the grid. This sery ice is also recompensed by the RTO/ISO.

For commercial and industrial vehicle owners, the vehicle battery can provide power to offset peak demand during the daytime and thus reduce the monthly demand charge imposed by the local distribution company. There is an opportunity for energy arbitrage in which the vehicle is charged at night when prices are low and partially discharged during the day if the value of the power is greater than its value in propelling the vehicle.

This invention utilizes the photovoltaic inverter of an existing solar photovoltaic system, and the on-board charger provided with the vehicle to provide a minimum-cost, bidirectional Electric Vehicle PhotoVoltaic (EVPV) interface. This interface can be programmed to maintain the vehicle in a suitable state of charge to provide the driving range needed by the owner using power from the grid at the optimum time to minimize cost, and to provide ancillary services to the grid to generate revenue to offset the cost of the vehicle and its energy supply.

The availability of AC power flow from the battery also provides a back up power supply to the vehicle owner when there are grid outages to maintain essential services such as heating and water pumps. This capability is particularly valuable in conjunction with a solar photovoltaic array which can provide power to keep the battery and the vehicle charged during outages and which in turn can be kept operating by "islanding" from the grid rather than shutting down as required by IEEE standard 1547 to avoid putting power back on the grid during an outage.

For both ancillary service and owner service it is an advantage to have the battery connected at all times to maximize revenue and convenience. However, by the nature of a vehicle, the vehicle battery is going to be disconnected when the vehicle is in use. This may be for as little as an hour or two or as much as 8 or 10 hours per day depending on use of the vehicle. An auxiliary stationary battery may be provided to maintain continuity of service while the vehicle is in use.

BRIEF SUMMARY OF THE INVENTION

This invention comprises the method of interfacing a large battery pack, as in an electric vehicle, with a grid-tied inverter in a photovoltaic system to provide ancillary services to the electric utility grid, and back up emergency power during grid outages, and the apparatus to accomplish the integration. The apparatus is an Electric Vehicle Photo-Voltaic (EVPV) integrator. In a previous patent application (2015-0162784) a similar apparatus comprising an off-board battery charger and a DC-DC converter of substantially equal capacity, with switching and control equipment to interface with the electric utility grid ISO, and appropriate cords and connectors to interface with the vehicle or other battery pack was described. The present invention accomplishes the same objective by using the on-board charger that is supplied by the vehicle and direct connecting the vehicle battery to an existing Photovoltaic inverter to reduce the cost of the EVPV. The EVPV consist only of switches and controls and communication means to accomplish the various functions enabled by the bidirectional connection to the vehicle battery.

BRIEF DESCRIPTION OF THE DRAWINGS

The means by which this objective is achieved by the present invention is illustrated in the accompanying Figures.

DETAILED DESCRIPTION OF THE INVENTION. THE PREFERRED EMBODIMENT

Figure 1:
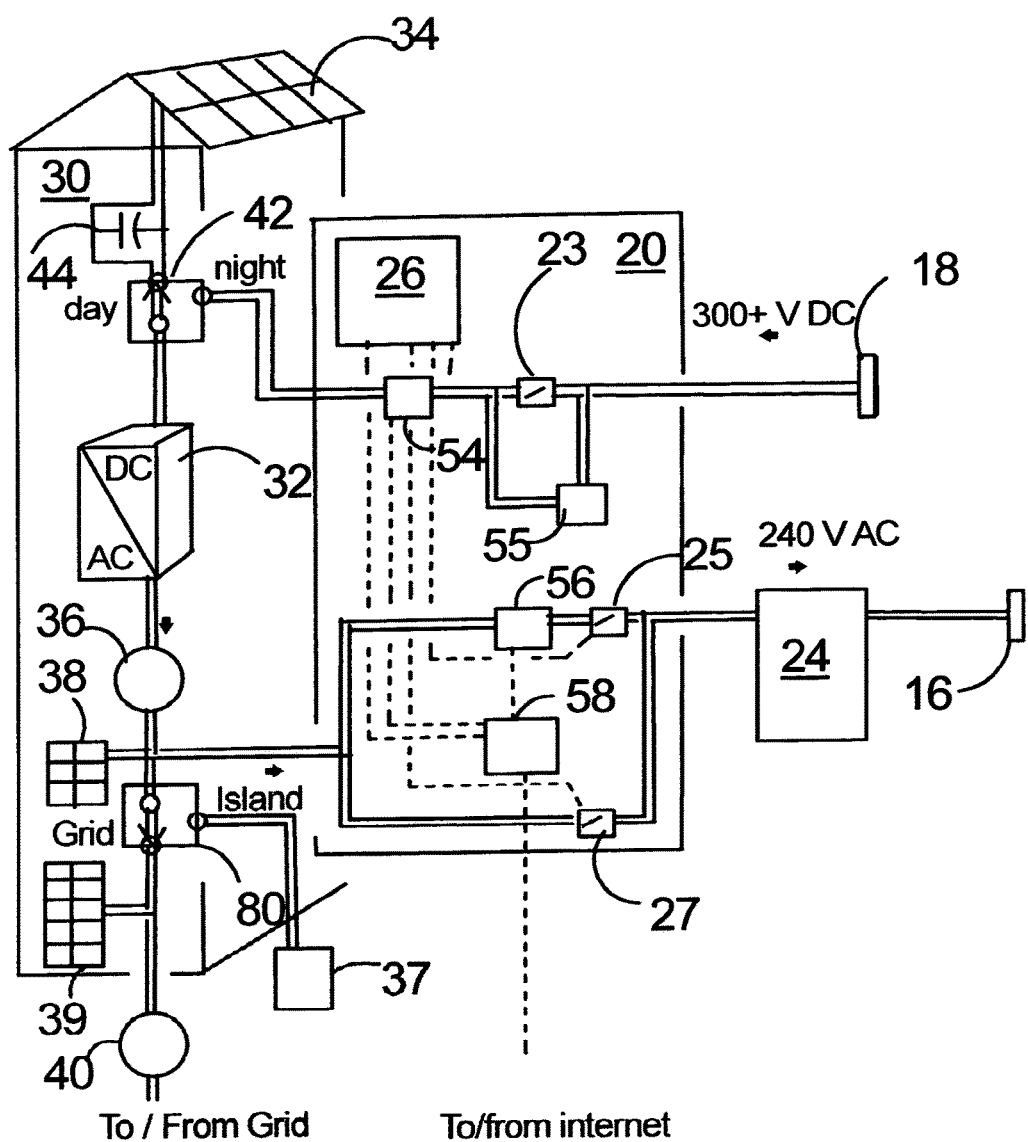
FIG. 1 is a schematic drawing of the apparatus of this invention in a typical installation illustrating the method of operation.

In FIG. 1 EVPV of this invention 20, is shown interfaced with AC wiring in building 30. An electric vehicle is supplied with AC power from EVPV 20 and Electric Vehicle Service Equipment 24 through connection 16 which may be the standard SAE J1772 level 2 plug and receptacle. The EVPV is also connected direct to the vehicle battery pack through DC connection 18, which may be any of the standard DC quick charge standards such a the Japanese standard CHAdeMO connector or the SAE CCS Combo connector used in German and US made vehicles. The CCS is convenient because it can connect both the AC and DC circuits through a single plug and receptacle. Tesla vehicles accomplish the same objective through the J-1772 connector by switching between AC regular and DC fast charging modes depending on signals relayed from the charger specifying its nature. There is an SAE J-1772 AC Level 2, DC Level 1 standard for this type of single connection, dual mode charging also. EVPV 20 is connected to the building 30 power installation by permanent AC and DC wiring.

EVPV 20 is hard wired to PV inverter 32 via switch 42. During the daylight hours when PV array 34 is producing power switch 42 is in the daytime position shown providing DC power to inverter 32 which converts it to AC power. The AC power flows through solar power meter 36 to critical load panel 38 and automatic transfer switch 80 to main load panel 39. Any excess power flows to the grid via net meter 40. There is a branch circuit from critical load panel 38 providing EVPV 20 with AC power to supply Electric Vehicle Service Equipment (EVSE) 24 which connects through connector 16 with the battery charger on board the vehicle.

At night when the PV array is no longer producing power switch 42 connects the inverter 32 to the vehicle battery to convert battery DC power to AC power. Vehicle battery packs are typically supplied at a nominal voltage of 300 to 400 VDC. Typical solar installations operate at 300 to 600 V, and even higher. Thus there is a good match between the voltage levels of low-cost, high-powered PV inverters and vehicle battery packs. This bidirectional connection to the vehicle battery through inverter 32 and EVSE 24 allows for the EVPV to provide ancillary services to the grid such as frequency regulation. These services are provided under Demand Response regulations which prohibit "injection" of power onto the grid even from net-metered solar installations. The present invention provides for net-metered solar production during the daylight hours and non-injecting ancillary service provision at night using the same components for maximum utilization and return on investment in the solar-electric vehicle combination.

The EVPV also contains control and switching equipment to accomplish the desired ancillary service functions. These functions are controlled by up regulation control means 23 and down regulation control means 25. These regulation control means are in turn interfaced to grid RTO/ISO ancillary service requests via Data Acquisition and Control System (DACS) 26 and Ethernet switch 58. DACS 26 may also control switch 27 to permit charging the battery pack only at times of favorable electricity prices to achieve TOU charging and to interrupt charging during periods of high demand to achieve demand management. Data on the response of the system from current transformers 54 and 56 are fed through switch 58 to the RTO/ISO via the internet.

In operation switches 23, 25 and 27 are controlled by site DACS controller 26, a locally-sited micro computer with communication via the internet or otherwise to frequency regulation and demand response signals from the local RTO/ISO which are managed by an off site aggregator. The aggregator combines individual vehicles to provide a minimum capability of use to the ISO in maintaining grid stability, typically 0.1 to 1.0 megawatts, (10 to 150 vehicles).

The provision of ancillary service requires that the power consumed or fed to the grid be proportional to the need transmitted by the ISO. This can be achieved by using proportionate controls on the inverter 32 and EVSE 24 as enabled by the J-1772 protocol for electric vehicle charging. Alternatively the charger and inverter may be controlled by simple on/off switches and the power of the aggregate controlled by the aggregator to provide a proportional output determined by how many of the vehicles are switched on at any time. A high impedance bypass connection 55 around switch 23 may be required to keep the inverter synchronized when control means 23 is off. Data flows from the EVPV through the aggregator to the ISO confirming performance and payments flow from the ISO to the aggregator and on to the vehicle owner or financial beneficiary.

Site controller 26 also receives requests from the vehicle operator as to the required state of charge needed to fulfill the expected mission of the vehicle and provides data on the current status.

In addition to providing demand response service to the utility grid, the flow of power from EVPV 20 to building 30 can be controlled by site controller 26 to offset peak demands for power and thus reduce the demand charge on the owner's monthly utility bill. This charge typically amounts to $10 to $20 per kW measured in any 15 minute period in the month and the peak demand charge is typically billed for 6 months to a year after it is incurred. There is thus a substantial incentive to reduce demand which inverter 20 can do, provided that it has access to battery storage.

Other Embodiments

Back-up Power Supply

The bidirectional connection of this invention also can provide back up power in emergencies when the grid fails. It does this in an optimum way by maintaining operation of the solar PV installation during the outage. Solar PV inverters contain "anti-islanding" features and are IEEE 1547 compliant for connection to the grid. This means that in an outage the PV system shuts down to avoid feeding power back onto the grid and endangering linemen attempting to fix the problem. In this invention automatic transfer switch 80 opens during an outage to "island" the building from the grid. Uninteruptable power supply 37 maintains power to keep inverter 32 functioning to provide power to critical loads 38 and EVSE 24. During the night-time hours when the PV array is not producing the vehicle battery can provide power via inverter 32 to support the critical loads during the outage. Switch 80 will need an intermediate off position in reconnecting to the grid on restoration of grid power to allow inverter 32 to unsynchronize from microgrid 20 and resynchronize with the grid per IEEE1547.

Supplementary Fixed Battery

Figure 2:
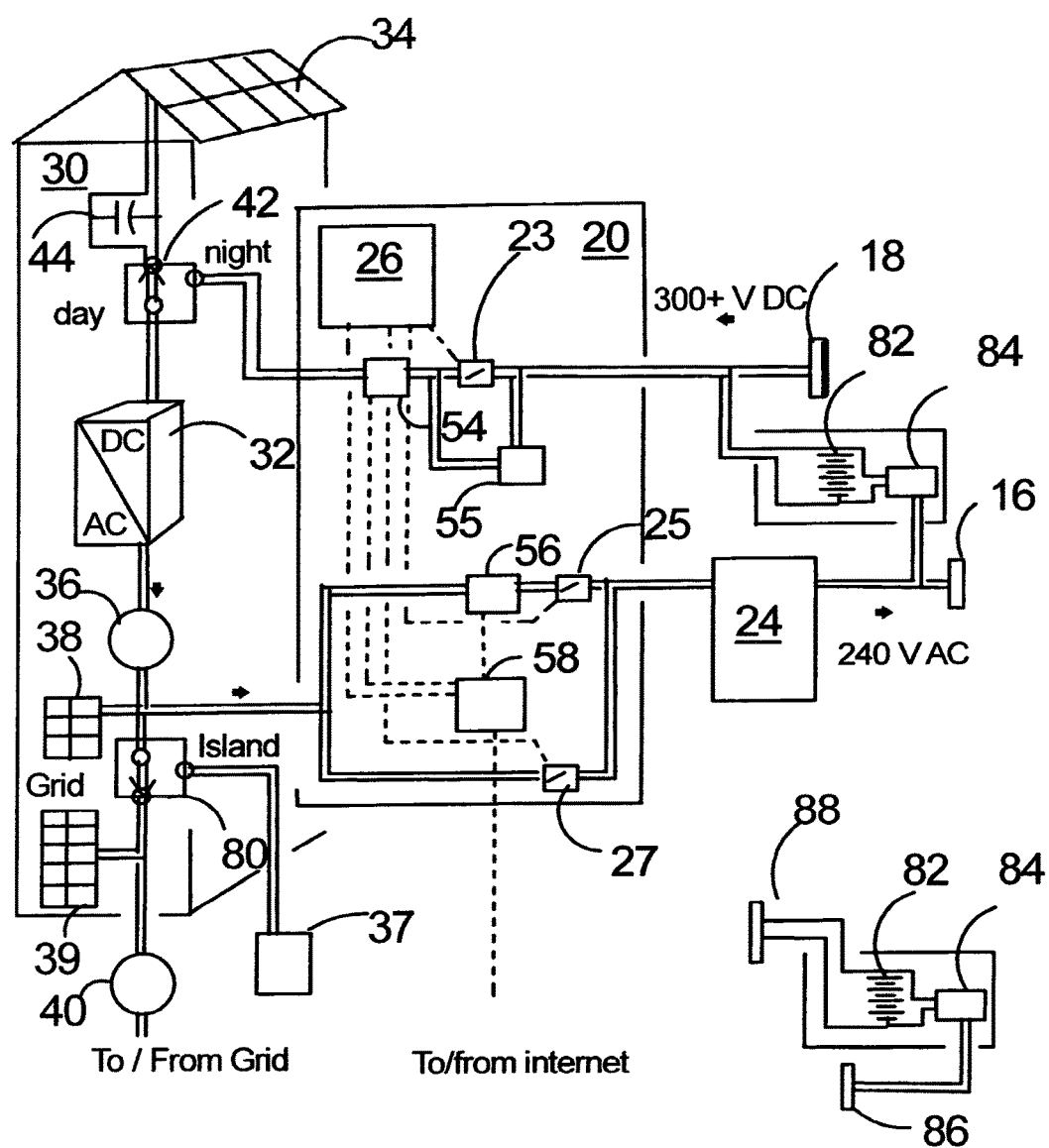
FIG. 2 is a schematic drawing of the apparatus of this invention with an auxiliary fixed battery hard-wired into the apparatus, or into which the apparatus can be plugged to maintain ancillary services and emergency power when the vehicle is in use.

In FIG. 2 a supplementary battery 82 with charger 84 and receptacles 86 and 88 may be provided to keep inverter 32 functioning while the vehicle is unplugged and operating. This may be most easily accomplished by unplugging the inverter from the vehicle and plugging it into the supplementary battery.

Alternatively, as shown in FIG. 2, supplemental battery 82 may be hard wired in parallel with vehicle connections 16 and 18. In this case a very close match between the vehicle batteries and fixed battery 82 is necessary since they are connected in parallel by the DC links 18 and 88. The use of vehicle batteries that have lost some of their capacity for stationary provision of ancillary services has been discussed in the literature and would be ideal in this application. A hard-wired connection to battery 82 will provide a fast charge up to approximately 50% State Of Charge to the vehicle when the latter is completely discharged at hook up.

Provision of supplemental battery 82 means that EVPV 20 is available 24 hours per day regardless of the vehicle usage. It supports ancillary services, demand charge management and emergency power during prolonged outages allowing the vehicle to be used while the building is still powered.

I claim:

1. An apparatus for bidirectional power conduction from and to an electric vehicle comprising:
   connection, switching and control devices to permit the apparatus to provide ancillary services to the electric utility grid while also providing electric energy to recharge the electric vehicle comprising;
   drawing DC power from a battery of the electric vehicle and passing the power through a DC connection and converting it to AC power by feeding it to an inverter of an existing photovoltaic power system whenever the photovoltaic array is producing power worth less that the ancillary services enabled by the apparatus, and
   putting electric energy back into the vehicle battery through an AC connection to an existing onboard battery charger of the vehicle, both of said DC and AC connections being connected to the vehicle simultaneously and continuously while it is parked for charging.

2. The apparatus of claim 1 in which the output only AC connection to the vehicle is a standard AC charging plug allowing it to be connected to the on-board charger of the electric vehicle.

3. The apparatus of claim 1 in which the DC connection to the vehicle is a standard DC quick charge connector allowing it to be directly connected to the propulsion battery of the electric vehicle.

4. The apparatus of claim 1 containing a local site controller, to control the functions of vehicle charging and discharging to provide ancillary service to the grid and backup power in emergencies.

5. The apparatus of claim 1 in which a data acquisition and control system is included to permit control in response to requests from the relevant RTO/ISO delivered via an aggregator or curtailment service provider over the internet or wireless telephone of the output of the inverter in up regulation and the vehicle charger in down regulation.

6. The apparatus of claim 1 in which a resistor is are used to connect the input of the inverter to the DC power to keep a small current flowing with which to keep the inverter synchronized when it is turned off.

7. The apparatus of claim 1 containing one or more revenue-grade current transformer meters which are used to measure performance of ancillary services to the grid.

8. The apparatus of claim 1 containing communication means which permit ancillary service commands such as for frequency regulation and demand response to be supplied to the apparatus and the resulting data on the response of the apparatus to be supplied to the regulator of electric energy supply such as a grid independent system organization (ISO).

9. The apparatus of claim 1 which is connected to the inverter of an existing a photovoltaic (PV) power system via a switch which can provide for PV power flow during the day and ancillary power flow at night when no PV energy is produced.

10. The apparatus of claim 1 in which the AC and DC connections can be switched or manually ported back and forth from the vehicle to a stationary supplementary battery.

11. The apparatus of claim 10 in which the supplementary battery is permanently connected.

12. The apparatus of claim 1 which is connected to a building power wiring, which is equipped with an automatic or manual transfer switch to isolate the building and the apparatus from the grid in event of a power failure, so that the vehicle battery can provide back-up power to the building.

13. The apparatus of claim 12 to provide backup power to a photovoltaic system from an electric vehicle battery by interconnection of the DC quick charge port of the electric vehicle with the DC input to the inverter of the PV system to provide AC output from the PV system for general use.

14. The apparatus of claim 1 to provide ancillary services to the relevant grid Regional Transmission Operator/Independent System Operator (RTO/ISO) by providing power to the grid from the Electric Vehicle battery in response to frequency regulation requests from the ISO for "up Reg." and taking power from the grid to recharge the battery in response to requests for "down Reg." or other Demand Response services during those times when the photovoltaic array is not producing enough power to offset the revenue from ancillary services.

* * * * *